(12) United States Patent
Kilpatrick

(10) Patent No.: US 10,552,601 B2
(45) Date of Patent: Feb. 4, 2020

(54) DEFERRED SUBSCRIPTION ACTIVATION USING BLOCKCHAIN

(71) Applicant: Red Hat, Inc., Raleigh, NC (US)

(72) Inventor: Justin M. Kilpatrick, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 356 days.

(21) Appl. No.: 15/408,504

(22) Filed: Jan. 18, 2017

(65) Prior Publication Data

US 2018/0203992 A1 Jul. 19, 2018

(51) Int. Cl.
*G06F 21/44* (2013.01)
*G06F 21/54* (2013.01)

(52) U.S. Cl.
CPC .............. *G06F 21/44* (2013.01); *G06F 21/54* (2013.01); *G06F 2221/0735* (2013.01); *G06F 2221/0744* (2013.01)

(58) Field of Classification Search
CPC .. G06F 21/44; G06F 21/54; G06F 2221/0735; G06F 2221/0744; H04L 9/3236; H04L 9/3297; H04L 2209/38; H04L 2209/56
See application file for complete search history.

(56) References Cited

U.S. PATENT DOCUMENTS

| | | | | |
|---|---|---|---|---|
| 8,588,110 B2 * | 11/2013 | Raleigh | ............ | G06Q 10/06375 370/259 |
| 8,639,625 B1 * | 1/2014 | Ginter | ..................... | G06F 21/10 705/50 |
| 9,253,211 B2 * | 2/2016 | Hoole | .................... | H04L 63/102 |
| 9,672,499 B2 * | 6/2017 | Yang | .................. | G06Q 20/3678 |
| 9,892,460 B1 * | 2/2018 | Winklevoss | ........... | G06Q 40/04 |
| 10,068,228 B1 * | 9/2018 | Winklevoss | ........... | G06Q 20/3829 |
| 10,269,009 B1 * | 4/2019 | Winklevoss | .......... | G06Q 20/105 |
| 10,354,325 B1 * | 7/2019 | Skala | | |
| 2007/0130079 A1 * | 6/2007 | Ivanov | .................... | G06F 21/10 705/59 |
| 2008/0140836 A1 | 6/2008 | Miyawaki et al. | | |
| 2013/0198856 A1 * | 8/2013 | Li | ......................... | G06F 21/105 726/27 |

(Continued)

OTHER PUBLICATIONS

Author Unknown, "Network," Bitcoin Wiki, last modified Feb. 20, 2016, 4 pages, https://en.bitcoin.it/wiki/Network.

(Continued)

*Primary Examiner* — Joseph P Hirl
*Assistant Examiner* — Stephen T Gundry
(74) *Attorney, Agent, or Firm* — Withrow & Terranova, PLLC

(57) ABSTRACT

Deferred subscription activation using blockchain is disclosed. A first plurality of blockchain blocks that contain authorized transactions that authorize corresponding activation request transactions associated with software instances of a plurality of software instances is received. A first grace period that differs from a current grace period based at least in part on at least one characteristic of the first plurality of blockchain blocks is determined. A request for activation associated with a first software instance is received. An execution timer for the first software instance is set to the first grace period to allow the first software instance to execute for at least the first grace period.

20 Claims, 7 Drawing Sheets

(56) References Cited

U.S. PATENT DOCUMENTS

| | | | | |
|---|---|---|---|---|
| 2013/0246303 | A1* | 9/2013 | Finck | G06Q 40/06 705/36 R |
| 2014/0181998 | A1* | 6/2014 | Hunt | H04W 12/08 726/30 |
| 2015/0067819 | A1* | 3/2015 | Shribman | H04L 67/06 726/12 |
| 2015/0143456 | A1* | 5/2015 | Raleigh | H04W 12/08 726/1 |
| 2015/0287026 | A1* | 10/2015 | Yang | G06Q 20/3678 705/69 |
| 2015/0332283 | A1 | 11/2015 | Witchey | |
| 2016/0055322 | A1* | 2/2016 | Thomas | G06F 21/10 726/7 |
| 2016/0292672 | A1 | 10/2016 | Fay et al. | |
| 2017/0091397 | A1* | 3/2017 | Shah | H04L 9/3236 |
| 2017/0116693 | A1* | 4/2017 | Rae | G06F 21/64 |
| 2017/0125404 | A1* | 5/2017 | Chang | H01L 27/0207 |
| 2017/0213267 | A1* | 7/2017 | Degaugue | H04L 51/16 |
| 2018/0089256 | A1* | 3/2018 | Wright, Sr. | G06F 16/2379 |
| 2018/0089651 | A9 | 3/2018 | Lund et al. | |
| 2018/0101906 | A1 | 4/2018 | Mcdonald et al. | |
| 2018/0121909 | A1* | 5/2018 | Christidis | G06Q 20/383 |
| 2018/0144378 | A1* | 5/2018 | Perez | G06Q 30/06 |
| 2018/0216946 | A1* | 8/2018 | Gueye | G01C 21/3492 |

OTHER PUBLICATIONS

Author Unknown, "Windows Activation in Development and Test Environments," Microsoft Corporation, White Paper, 2010, 11 pages, https://technet.microsoft.com/en-us/en%C2%ADus/library/dd981009.aspx.

Bheemaiah, Kariappa, "Block Chain 2.0: The Renaissance of Money," Wired, available at least as early as Oct. 27, 2016, 14 pages, https://www.wired.com/insights/2015/01/block-chain-2-0/.

Brantley, Bill, "The Data Briefing: I, for One, Welcome Our New Chatbot Blockchain Digital Autonomous Organizations," DIGITALGOV, Jul. 6, 2016, 6 pages, https://www.digitalgov.gov/2016/07/06/the-data-briefing-i-for-one-welcome-our-new-chatbot-blockchain-digital-autonomous-organizations/.

linewbie.com, "Does an un-confirmed Bitcoin transaction expire?," Linux Open Source Blog, Jul. 1, 2016, 12 pages, http://linewbie.com/2016/07/does-an-un-confirmed-bitcoin-transaction-expire.html.

Nakamoto, Satoshi, "Bitcoin: A Peer-to-Peer Electronic Cash System," Bitcoin.org, White Paper, Mar. 2009, 9 pages.

Non-Final Office Action for U.S. Appl. No. 15/393,940, dated Mar. 6, 2019, 29 pages.

Final Office Action for U.S. Appl. No. 15/393,940, dated Aug. 7, 2019, 30 pages.

Advisory Action and Applicant-Initiated Interview Summary for U.S. Appl. No. 15/393,940, dated Nov. 12, 2019, 5 pages.

* cited by examiner

DEFERRED SUBSCRIPTION ACTIVATION USING BLOCKCHAIN

TECHNICAL FIELD

The examples relate generally to authorizing software instances, and in particular to deferred subscription activation using blockchain.

BACKGROUND

Software instances often ensure that they are appropriately authorized to execute prior to providing substantive services. This may be done for a number of reasons, including to ensure that the software has not been pirated, and/or as part of a subscription-based model.

SUMMARY

The examples disclosed herein reduce the opportunity for abuse or fraudulent use of an execution grace period by implementing a dynamic grace period that changes based on metrics associated with requests for authorization and corresponding authorizations, or failures to authorize.

In one example, a method is provided. The method includes receiving, by a computing device comprising a processor device, a first plurality of blockchain blocks that contain authorized transactions that authorize corresponding activation request transactions associated with software instances of a plurality of software instances. The method further includes determining a first grace period that differs from a current grace period based at least in part on at least one characteristic of the first plurality of blockchain blocks. The method further includes receiving a request for activation associated with a first software instance, and setting an execution timer for the first software instance to the first grace period to allow the first software instance to execute for at least the first grace period.

In another example a computing device is provided. The computing device includes a memory and a processor device coupled to the memory. The processor device is to receive a first plurality of blockchain blocks that contain authorized transactions that authorize corresponding activation request transactions associated with software instances of a plurality of software instances. The processor device is further to determine a first grace period that differs from a current grace period based at least in part on at least one characteristic of the first plurality of blockchain blocks. The processor device is further to receive a request for activation associated with a first software instance, and set an execution timer for the first software instance to the first grace period to allow the first software instance to execute for at least the first grace period.

In another example a computer program product stored on a non-transitory computer-readable storage medium is provided. The computer program product includes instructions to cause a processor device to receive a first plurality of blockchain blocks that contain authorized transactions that authorize corresponding activation request transactions associated with software instances of a plurality of software instances. The instructions further cause the processor device to determine a first grace period that differs from a current grace period based at least in part on at least one characteristic of the first plurality of blockchain blocks. The instructions further cause the processor device to receive a request for activation associated with a first software instance, and set an execution timer for the first software instance to the first grace period to allow the first software instance to execute for at least the first grace period.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
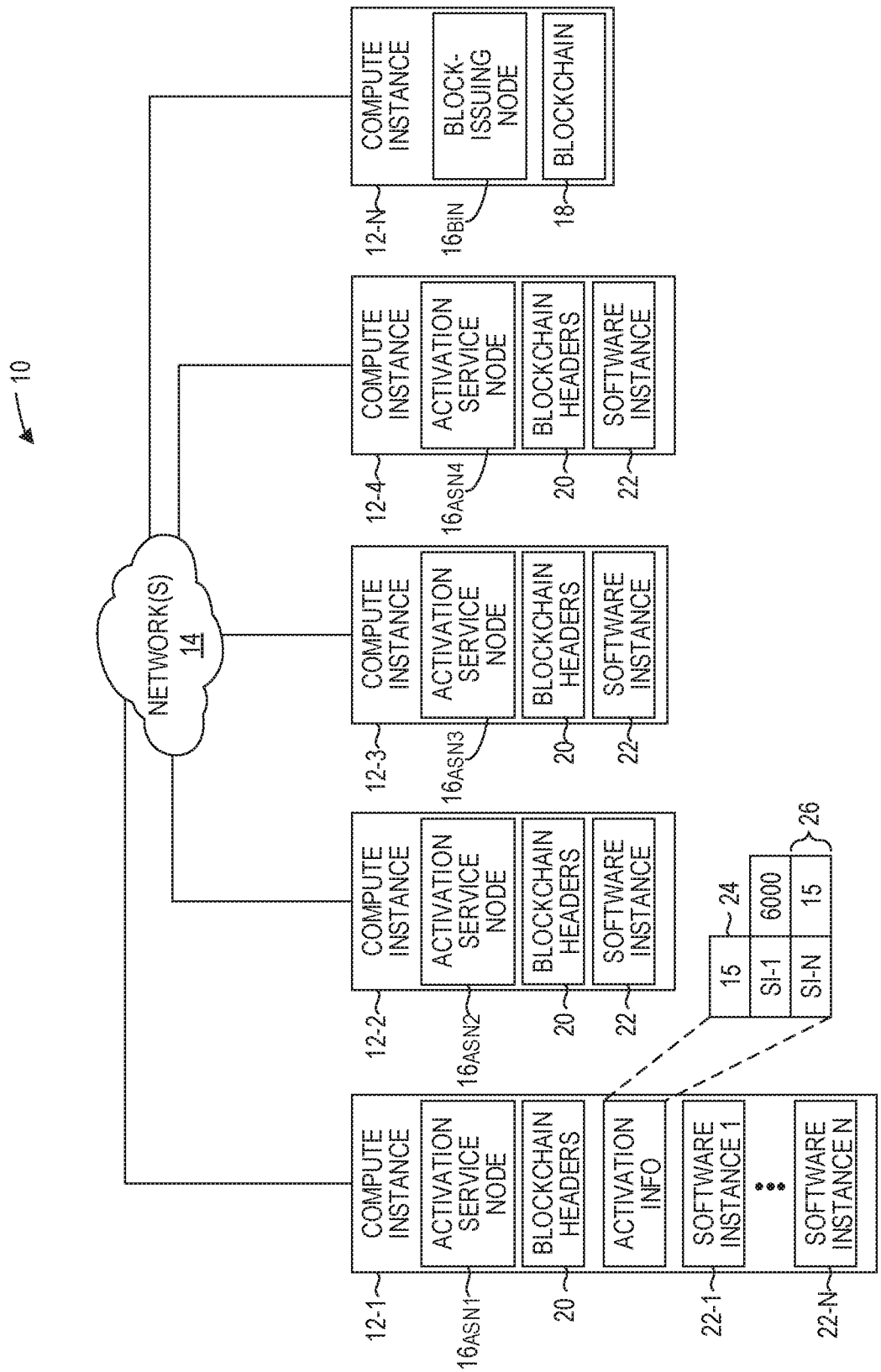
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first grace period" and "second grace period," and does not imply a priority, a type, an importance, or other attribute, unless otherwise stated herein. As used herein and in the claims, the articles "a" and "an" in reference to an element refers to "one or more" of the element unless otherwise explicitly specified.

The phrase "software instance," as discussed herein, refers to a single executing occurrence of a software-implemented service. A software instance is typically a discrete software component, such as an operating system, a database, a business application, a middleware component, and the like.

Software as a service is a software licensing model in which customers pay a recurring subscription fee for access to a software product deployed and managed by a manufacturer of the software. This software licensing model implies the existence of significant infrastructure to run the software on the manufacturer's end. In the software as a service software licensing model, the prerequisite infrastructure may make it relatively straightforward to track application usage.

Subscription software is a software licensing and provisioning model in which customers pay a recurring subscription fee for access to a software product for deployment on local physical or virtual servers, or cloud-based servers for a specified time interval (e.g., a billing period). The subscription software model enables subscribing customers to securely and efficiently deploy and operate software, and to access support resources during a subscription period. However, providers of subscription software licenses often do not have the same robust infrastructure and may find it cost infeasible to create such an infrastructure for the sole purpose of providing customer desired, higher fidelity billing. Among other advantages, the examples facilitate billing in a subscription software system that is both cost feasible and robust against fraud.

Software instances often ensure that they are appropriately authorized to execute prior to providing substantive services. This may be done for a number of reasons, including to ensure that the software has not been pirated, and/or as part of a subscription-based model. Often software instances are authorized to run by a centralized authentication service that receives requests for authorization from software instances and authorizes the software instances if certain criteria are met. In a large-scale environment, where thousands or tens of thousands of software instances may be running, a centralized authentication service can be a bottleneck, leading to long delays between a request for authorization and the corresponding authorization as the centralized authentication service processes an ever-growing queue of requests for authorization.

One mechanism for dealing with a delay introduced by an authentication service is to allow the software instance to execute for a grace period of time to allow the authentication service to process the request for authorization and to authorize the software instance, if appropriate. However, this introduces a possibility for abuse, or fraud, by an entity that knowingly initiates software instances that will not be authorized, yet incurs the benefit of the software instances for the grace period. In the world of computing-on-demand offered by cloud computing infrastructures, this type of behavior could result in substantial losses to a service provider who is not compensated for the benefits obtained from unauthorized software instances during the grace period.

The examples disclosed herein reduce the opportunity for abuse or fraudulent use of a grace period by implementing a dynamic grace period that changes based on metrics associated with requests for authorization and corresponding authorizations, or failures to authorize. For example, if all, or substantially all requests for authorization are ultimately granted, the default grace period may be maintained or extended. If, on the other hand, none or few requests for authorization are granted, the grace period may be dramatically reduced.

The examples described herein include providing blockchain-based authorization management. As used herein, a "blockchain" refers to a decentralized database that maintains a list of ordered records ("blockchain blocks") that, once recorded, are resistant to retroactive modification. An example of a blockchain-based technology is the payment network Bitcoin (bitcoin.org).

A software instance refers to a single executing occurrence of a software-implemented service that runs on or as part of a computing instance, and is typically a discrete software component, such as an operating system, a database, a business application, a middleware component, and the like. A licensed software instance refers to a software instance that is authorized to provide the software-implemented service.

FIG. 1 is a block diagram of an environment 10 in which examples may be practiced. The environment 10 includes a plurality of compute instances 12-1-12-N (generally, compute instances 12) communicatively coupled via one or more networks 14. A compute instance 12, as discussed herein, refers to a discrete runtime environment, and may comprise a physical machine configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance 12 thus, whether a physical machine or a virtual machine, includes a memory and a processor device. While for purposes of illustration five compute instances 12 are illustrated, the environment 10 may in practice have tens, hundreds, or thousands of compute instances 12.

A plurality of nodes $16_{ASN1}$, $16_{ASN2}$, $16_{ASN3}$, $16_{ASN4}$, and $16_{BIN}$ (generally, nodes 16), make up a network of nodes 16 that utilize a blockchain 18 as a mechanism for requesting authorization for software instances and for granting such requests, as discussed in greater detail herein. A node 16 that provides activation services to software instances will be referred to herein as an activation service node $16_{ASN}$, and a node 16 that authorizes requests for authorizations via the blockchain 18 will be referred to herein as a block-issuing node $16_{BIN}$. While for purposes of illustration the activation service nodes $16_{ASN}$ and the block-issuing node $16_{BIN}$ are shown as separate nodes 16, in practice a node 16 may be both an activation service node $16_{ASN}$ and a block-issuing node $16_{BIN}$. Additionally, while for purposes of illustration only four activation service nodes $16_{ASN}$ and one block-issuing node $16_{BIN}$ are illustrated, in operation the environment 10 may utilize any number of activation service nodes $16_{ASN}$ and any number of block-issuing nodes $16_{BIN}$.

As each node 16 initiates on the respective compute instance 12, the node 16 discovers other nodes 16 via conventional discovery methods for a peer-to-peer network, and records the communication address of such other nodes 16. This may be facilitated, for example, by a central discovery service that can identify neighboring nodes 16 of a respective node 16. In other examples, a node 16 may broadcast a message onto the network 14 that identifies the respective node 16. Other nodes 16 that receive the identification message may respond with messages that identify such other nodes 16.

Subsequent communications between the nodes 16 are initiated via a broadcast mechanism wherein each node 16 initiates messages by broadcasting the messages to the list of nodes 16 known to the respective node 16. Each node 16 also receives messages from other nodes 16, and in turn, rebroadcasts such messages to other nodes 16. In this manner, messages propagate from one node 16 to another node 16 over time, even though there may be hundreds, or thousands, of nodes 16 in the network of nodes 16.

Activation service nodes $16_{ASN}$, during initiation, typically obtain a history of blockchain headers 20 of the blockchain 18. This may be accomplished in any of a number of different ways. In one example, the activation service node $16_{ASN}$ may download a copy of the blockchain 18, verify the entire blockchain 18, and retain only the blockchain headers 20 of the blockchain 18. In another example, the activation service node $16_{ASN}$ may request an existing copy of the blockchain headers 20 from a trusted node 16, such as another activation service node $16_{ASN}$ or a block-issuing node $16_{BIN}$. In this example, assume that an activation service node $16_{ASN}$ broadcasts a request for blockchain headers 20, and the request propagates to the block-issuing node $16_{BIN}$ which, in response, then obtains the blockchain headers 20 of the blockchain 18 and broadcasts the blockchain headers 20. The blockchain headers 20 ultimately propagate to the requesting activation service node $16_{ASN}$, which then stores the blockchain headers 20. The blockchain headers 20 utilize substantially less space than the blockchain 18. Among other advantages, having a complete history of the blockchain headers 20 of the blockchain 18 allows the activation service nodes $16_{ASN}$ to verify that each subsequent blockchain block received originated from a valid block-issuing node $16_{BIN}$.

An activation service node $16_{ASN}$, such as the activation service node $16_{ASN1}$, provides activation services for a software instance, such as, in this example, the software instances 22-1-22-N. As an example, as the software instance 22-N initiates, the software instance 22-N sends a request for authorization to the activation service node $16_{ASN1}$. While for purposes of illustration the activation service node $16_{ASN1}$ is shown as being a component of the same compute instance 12-1 as that of the software instance 22-N, in practice, the activation service node $16_{ASN1}$ may be a component of another compute instance 12. A software instance 22 may access configuration information that identifies a particular activation service node $16_{ASN}$ from which the software instance 22 should seek authorization, or a software instance 22 may be initiated with a parameter that directs the software instance 22 to a particular activation service node $16_{ASN}$, or a software instance 22 may have a search process which includes searching for and identifying a particular activation service node $16_{ASN}$.

The activation service node $16_{ASN1}$ accesses a grace period 24 that identifies an execution grace period during which the software instance 22-N may execute prior to authorization. In this example, the grace period 24 is 15 seconds. The activation service node $16_{ASN1}$ generates an execution timer 26 and sets the execution timer 26 to the grace period 24. In one example, the activation service node $16_{ASN1}$ may also communicate to the software instance 22-N that the software instance 22-N may continue execution. In other examples, the software instance 22-N continues to execute without the need for a communication from the activation service node $16_{ASN1}$ because the software instance 22-N will be subsequently directed to terminate by the activation service node $16_{ASN1}$ if the software instance 22-N is not authorized by the end of the grace period 24. The activation service node $16_{ASN1}$ then initiates a transaction to seek authorization for the software instance 22-N from the block-issuing node $16_{BIN}$, as will be discussed in greater detail below with regard to FIG. 2. The activation service nodes $16_{ASN2}$-$16_{ASN4}$ operate identically or substantially similarly to the activation service node $16_{ASN1}$ with respect to other software instances 22.

Figure 2A:
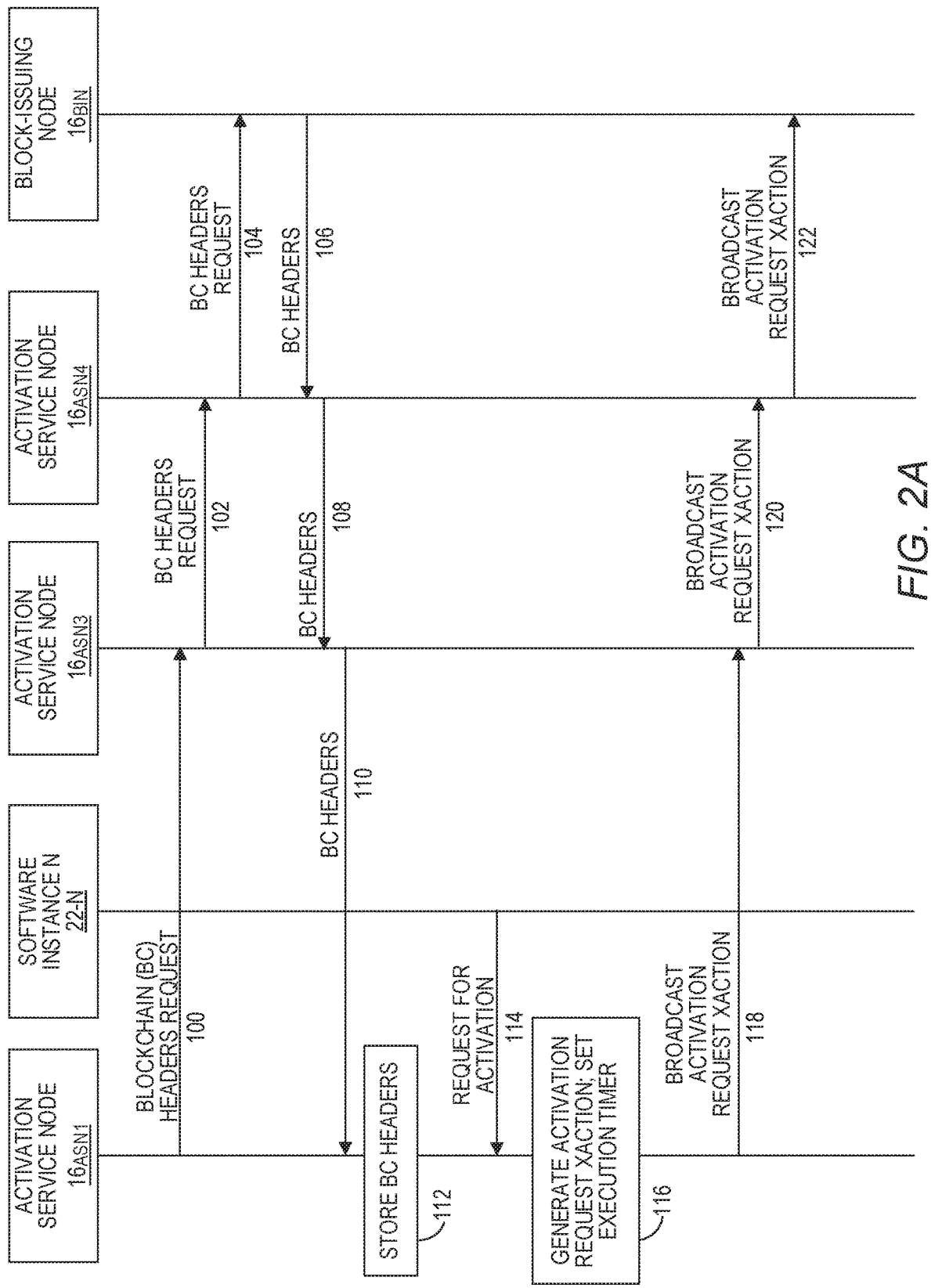
FIGS. 2A-2B are a message flow diagram of a mechanism for deferred subscription activation using blockchain according to one example.
Figure 2B:
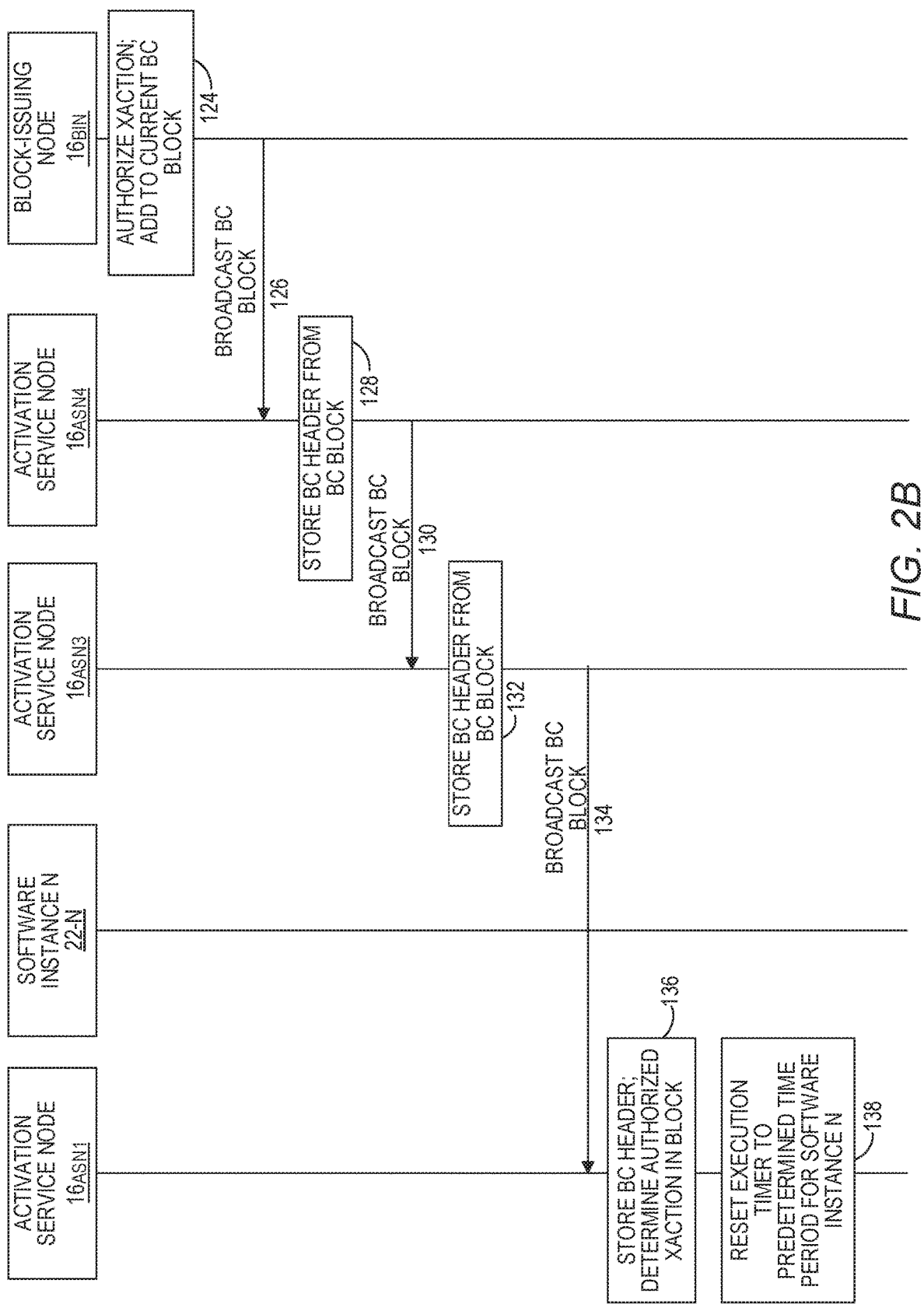

With this context of the environment 10, reference will now be made to FIG. 2, which is a message flow diagram illustrating the authorization of an activation request according to one example. FIG. 2 will be discussed in conjunction with FIG. 1. Referring now to FIG. 2A, as the activation service node $16_{ASN1}$ initiates, the activation service node $16_{ASN1}$ broadcasts a blockchain headers request (step 100). In this example, assume that the activation service node $16_{ASN1}$ broadcasts the blockchain headers request to the activation service node $16_{ASN3}$, which in turn broadcasts the blockchain headers request to the activation service node $16_{ASN4}$ (step 102). The activation service node $16_{ASN4}$ broadcasts the blockchain headers request to the block-issuing node $16_{BIN}$ (step 104). Note that while FIG. 2A illustrates the blockchain headers request as traversing two activation service nodes $16_{ASN3}$ and $16_{ASN4}$ prior to reaching the block-issuing node $16_{BIN}$, in operation the blockchain headers request may traverse any number of activation service nodes $16_{ASN}$ prior to reaching the block-issuing node $16_{BIN}$, or, alternatively, the block-issuing node $16_{BIN}$ may be in the broadcast list of the activation service node $16_{ASN1}$, and may receive the blockchain headers request directly from the activation service node $16_{ASN1}$.

The block-issuing node $16_{BIN}$ generates the blockchain headers from the blockchain 18, and broadcasts the blockchain headers, which may follow the reverse path through the activation service nodes $16_{ASN4}$ and $16_{ASN3}$ before being received by the activation service node $16_{ASN1}$, or, may traverse different activation service nodes $16_{ASN}$ before reaching the activation service node $16_{ASN1}$ (steps 106-110). The activation service node $16_{ASN1}$ stores the blockchain headers (step 112). Assume that the software instance 22-N now initiates. Upon initiation the software instance 22-N sends a request for activation to the activation service node $16_{ASN1}$ (step 114). The activation service node $16_{ASN1}$ accesses the grace period 24 and sets an execution timer 26 associated with the software instance 22-N to grace period 24. The activation service node $16_{ASN1}$ also generates an activation request transaction that seeks authorization for the software instance 22-N. The activation request transaction may identify the activation service node $16_{ASN1}$, the software instance 22-N, a type of software instance of the software instance 22-N, and may also request a particular execution time, such as 1 hour, 2 hours, or the like. The activation service node $16_{ASN1}$ may also authenticate the activation request transaction, such as via a digital signature, an encryption key, or the like (step 116).

The activation service node $16_{ASN1}$ broadcasts the activation request transaction (step 118). Again assume that the activation service node $16_{ASN1}$ broadcasts the activation request transaction to the activation service node $16_{ASN3}$, which in turn broadcasts the activation request transaction to the activation service node $16_{ASN4}$ (step 120). The activation service node $16_{ASN4}$ broadcasts the activation request transaction to the block-issuing node $16_{BIN}$ (step 122). In some examples, each activation service node $16_{ASN}$ maintains an in-memory list of activation request transactions that the respective activation service node $16_{ASN}$ has generated, as well as those received from other activation service nodes $16_{ASN}$. As an activation service node $16_{ASN}$ receives a blockchain block that contains authorized transactions, the activation service node $16_{ASN}$ may remove from its in-memory list those activation request transactions that correspond to the authorized transactions in the blockchain block.

The block-issuing node $16_{BIN}$ receives the activation request transaction and, based on one or more criterion, determines whether or not the activation request transaction should be authorized. Such criterion may be system or customer dependent and may be based on, for example, one or more of a total number of authorized activation request transactions, a type of the software instance 22-N, or the like. For purposes of illustration assume that the block-issuing node $16_{BIN}$ authorizes the activation request transaction, generates an authorized transaction, and adds the authorized transaction to a pending blockchain block (step 124). The pending blockchain block may not yet be committed to the blockchain 18. The block-issuing node $16_{BIN}$ may wait until a predetermined length of time has elapsed before committing the pending blockchain block to the blockchain 18, or, if the pending blockchain block becomes full with authorized transactions, may commit the pending blockchain block to the blockchain 18 prior to the predetermined amount of time elapsing.

After the block-issuing node $16_{BIN}$ commits the pending blockchain block to the blockchain 18, the block-issuing node $16_{BIN}$ broadcasts the blockchain block (step 126). In this example, assume again that the broadcast of the blockchain block includes sending the blockchain block to the activation service node $16_{ASN4}$. The activation service node $16_{ASN4}$ stores the blockchain header from the blockchain block (step 128). The activation service node $16_{ASN4}$ also analyzes the blockchain block to determine if the blockchain block contains any authorized transactions that correspond to activation request transactions broadcast by the activation service node $16_{ASN4}$. The activation service node $16_{ASN4}$ broadcasts the blockchain block, which in this example includes sending it to the activation service node $16_{ASN3}$ (step 130). The activation service node $16_{ASN3}$ stores the blockchain header from the blockchain block (step 132). The activation service node $16_{ASN3}$ also analyzes the blockchain block to determine if the blockchain block contains any authorized transactions that correspond to activation request transactions broadcast by the activation service node $16_{ASN3}$.

The activation service node $16_{ASN3}$ broadcasts the blockchain block, which, in this example, includes sending it to the activation service node $16_{ASN1}$ (step 134). The activation service node $16_{ASN1}$ stores the blockchain header from the blockchain block. The activation service node $16_{ASN1}$ also determines that the blockchain block contains an authorized transaction that corresponds to the activation request transaction associated with the request for activation of the software instance 22-N (step 136). In response, the activation service node $16_{ASN1}$ resets the execution timer of the software instance 22-N to a predetermined time period that is greater than the grace period 24 (step 138). The activation service node $16_{ASN1}$ also broadcasts the blockchain block.

The grace period 24 provides a length of time for which a software instance 22, such as the software instance 22-N, can execute prior to authorization by the block-issuing node $16_{BIN}$ to eliminate a need for the software instance 22-N to delay execution until authorized. If the software instance 22-N was not authorized within the grace period, the execution timer 26 would expire, and the activation service node $16_{ASN1}$ would direct the software instance 22-N to terminate. However, the grace period 24 also represents a period of time in which the software instance 22-N executes without authorization, and thus could be exploited to knowingly obtain services from a software instance 22 that will not be authorized. In a computing-on-demand service, such as in a cloud computing infrastructure, the grace period 24 could be used to knowingly obtain services from hundreds or thousands of software instances 22 without authorization.

Figure 3:
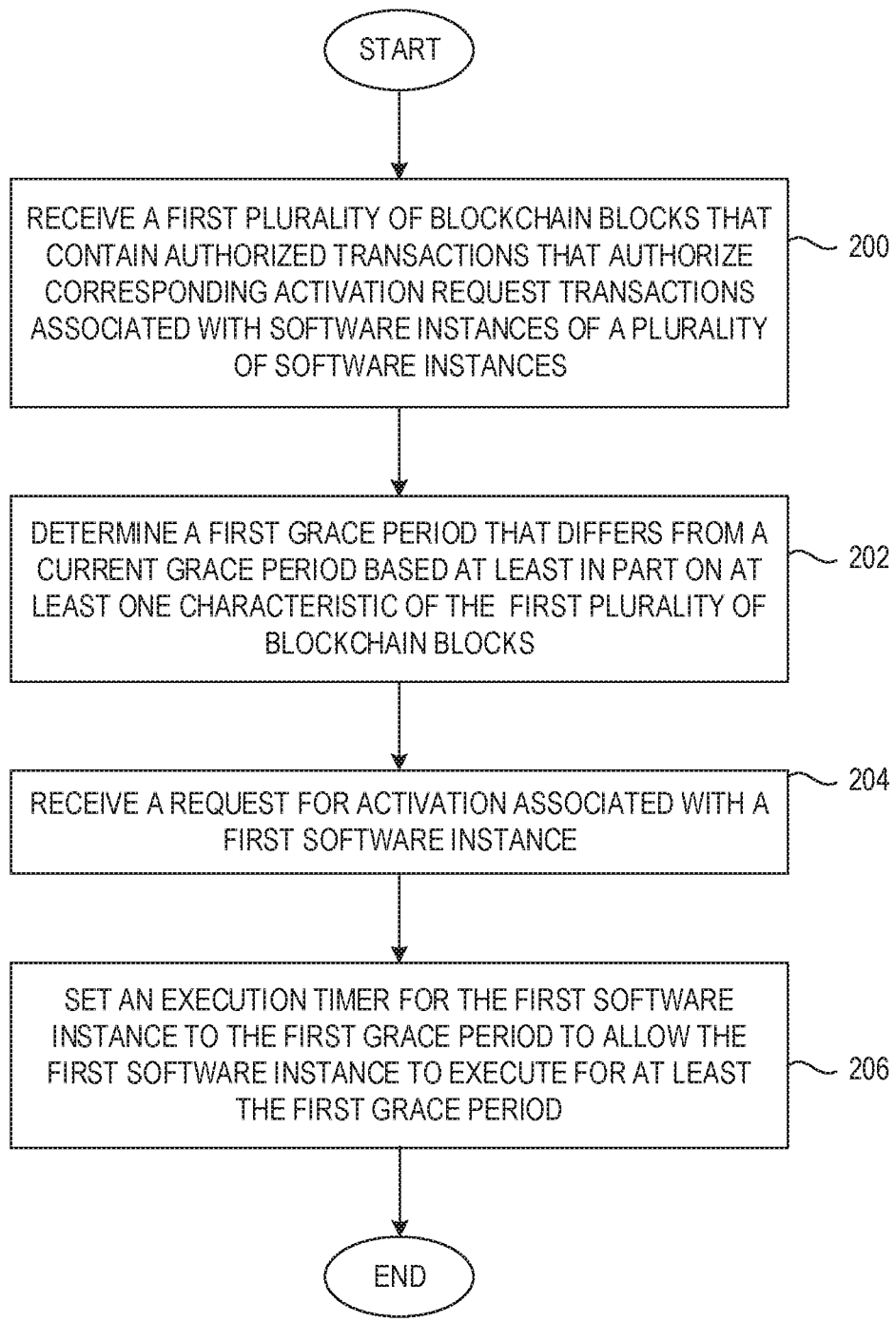
FIG. 3 is a flowchart of a method for altering the grace period of a software instance based on a blockchain according to one example.

The examples greatly reduce the opportunity to fraudulently abuse the grace period 24 by analyzing the activity of the network and altering the grace period 24 based on characteristics of the blockchain blocks of the blockchain 18. FIG. 3 is a flowchart of a method for altering the grace period 24 based on the blockchain 18 according to one example. The activation service node $16_{ASN1}$ receives a first plurality of blockchain blocks that contain authorized transactions that authorize corresponding activation request transactions associated with software instances 22 of a plurality of software instances 22 (FIG. 3, block 200). This may occur over a period of time, such as one minute, ten minutes, thirty minutes, or any other predetermined period of time. Note that over the same period of time the activation service node $16_{ASN1}$ may be receiving one or more requests for activation from one or more corresponding software instances 22, and may be receiving activation request transactions being broadcasted by other activation service nodes $16_{ASN}$. The activation service node $16_{ASN1}$ determines a first grace period that differs from a current grace period based at least in part on at least one characteristic of the first plurality of blockchain blocks (FIG. 3, block 202). The at least one characteristic may include, for example, a fullness of the received blockchain blocks, an amount of time the received blockchain blocks take to propagate across the network, and any number of other characteristics. Example characteristics will be discussed below with regard to FIG. 4.

After the activation service node $16_{ASN1}$ has determined the first grace period, the activation service node $16_{ASN1}$ receives a request for activation associated with a first software instance 22 (FIG. 3, block 204). The activation service node $16_{ASN1}$ sets an execution timer for the first software instance 22 to the first grace period to allow the first software instance 22 to execute for at least the first grace period (FIG. 3, block 206). This process may be repeated on an ongoing basis to dynamically alter the grace period 24 based at least in part on the blockchain blocks of the blockchain 18 received by the activation service node $16_{ASN1}$, as well as other information, such as the requests for authorization received from one or more software instances 22, and activation request transactions broadcasted by other activation service nodes $16_{ASN}$.

Figure 4:
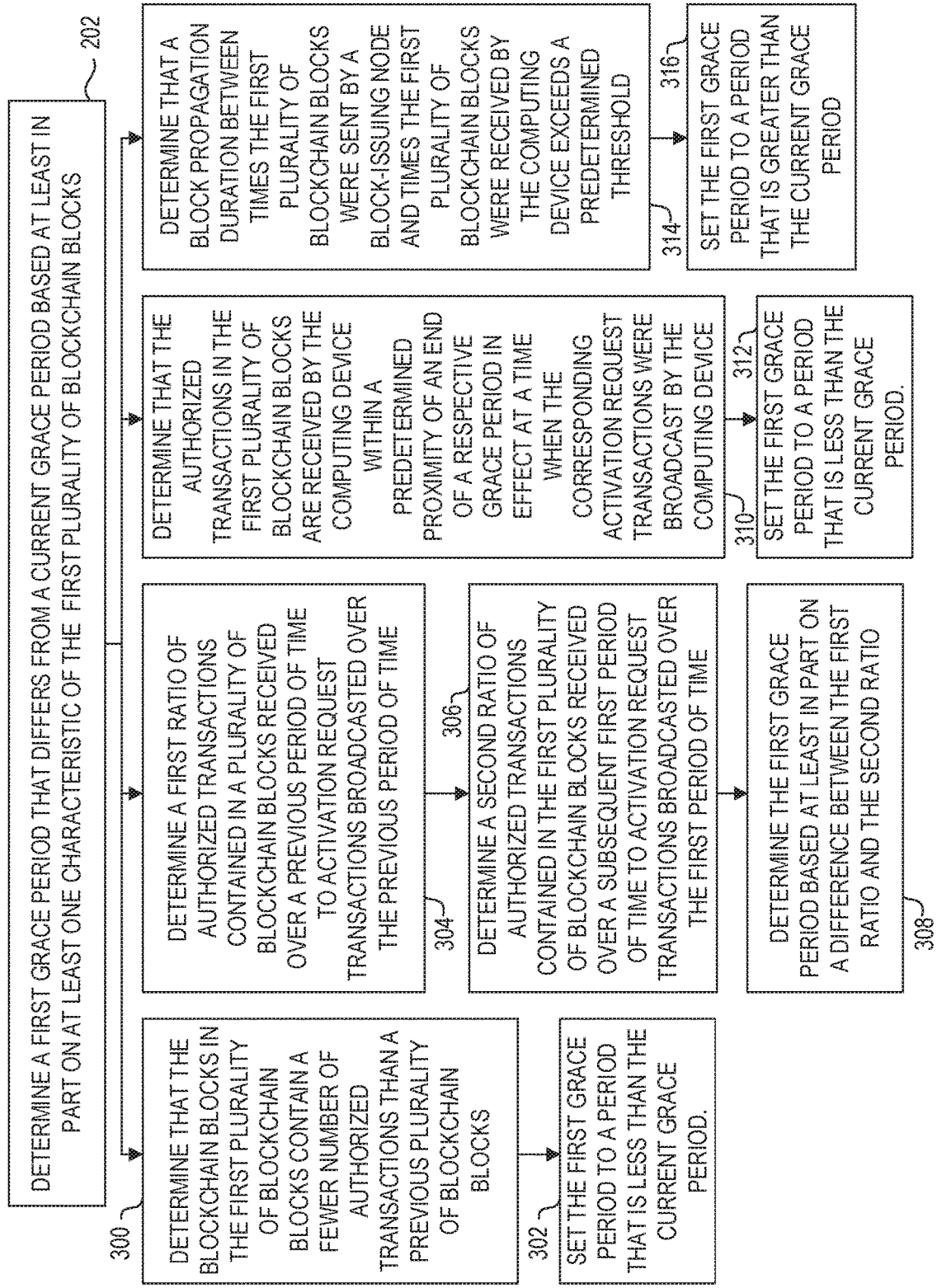
FIG. 4 is a block diagram illustrating an aspect of FIG. 3 in greater detail.

FIG. 4 is a block diagram illustrating step 202 of FIG. 3 in greater detail. In particular, FIG. 4 illustrates four example grace period determinations by an activation service node based at least in part on a characteristic of a plurality of blockchain blocks. In a first example, the activation service node $16_{ASN1}$ determines that the blockchain blocks in the first plurality of blockchain blocks contain a fewer number of authorized transactions than a previous plurality of blockchain blocks (block 300). In particular, the activation service node $16_{ASN1}$ may, for a first period of time, analyze each received blockchain block, and maintain a first quantifier, such as an average, a mean, a median, or the like, that quantifies a number of authorized transactions contained in the blockchain blocks over the first period of time. Subsequently, over a second period of time, the activation service node $16_{ASN1}$ may, for the second period of time, also analyze each received blockchain block, and maintain a second quantifier, such as an average, a mean, a median, or the like, that quantifies a number of authorized transactions contained in the blockchain blocks over the second period of time. If the second quantifier is less than the first quantifier, then, over the second period of time fewer authorized transactions are being granted than during the first period of time. The activation service node $16_{ASN1}$ may also access its in-memory list of activation request transactions and determine that there are a non-trivial number of activation request transactions still awaiting authorization. A substantial number of activation request transactions still awaiting authorization, in conjunction with fewer authorized transactions per blockchain block, may be an indication that more authorization request transactions broadcast by the activation service nodes $16_{ASN}$ are being denied or rejected by block-issuing nodes $16_{BIN}$, which in turn may imply that many software instances 22 are being initiated without expectation of authorization. In response, the activation service node $16_{ASN1}$ sets the first grace period to a period that is less than the current grace period, to reduce the amount of time a software instance 22 can execute without authorization (block 302).

In a second example, during a previous period of time, the activation service node $16_{ASN1}$ determines a first ratio of authorized transactions contained in the plurality of blockchain blocks received over the previous period of time to activation request transactions broadcasted over the previous period of time (block 304). The activation request transactions may include those initiated by the activation service node $16_{ASN1}$ itself, as well as those received from other activation service nodes $16_{ASN}$. Subsequently, the activation service node $16_{ASN1}$ determines a second ratio of authorized transactions contained in the first plurality of blockchain blocks received over the subsequent first period of time to activation request transactions broadcasted over the first period of time (block 306). The activation service node $16_{ASN1}$ then determines the first grace period based, at least in part, on a difference between the first ratio and the second ratio (block 308). For example, if the second ratio is smaller than the first ratio, then a lower ratio of activation request transactions were granted over the first period of time than the previous period of time, which may indicate more software instances 22 were initiated fraudulently, and the activation service node $16_{ASN1}$ may set the first grace period to a period that is less than the current grace period. On the other hand, if the second ratio is greater than the first ratio, then a higher ratio of activation request transactions were granted over the first period of time than the previous period of time, which may indicate fewer software instances 22 were initiated fraudulently, and the activation service node $16_{ASN1}$ may set the first grace period to a period that is greater than the current grace period.

In a third example, the activation service node $16_{ASN1}$ determines that the authorized transactions in the first plurality of blockchain blocks are received by the computing device within a predetermined proximity of an end of a respective grace period in effect at a time when the corresponding activation request transactions were broadcast by the computing device (block 310). For example, the activation service node $16_{ASN1}$ may determine that all, substantially all, or a particular percentage of authorized transactions are authorized near the end of the grace period, such as with ten seconds remaining in the grace period, five seconds remaining in the grace period, two seconds remaining in the grace period, or the like. In an environment where a customer may control or influence the granting and timing of authorization transactions, such as where a customer is in control of the activation service node $16_{BIN}$, and where the customer is charged for a period of time beginning with the recording of the authorization transaction in the blockchain 18, such authorization transactions may be an attempt by the customer to utilize the entire grace period without compensation. In response, the activation service node $16_{ASN1}$ may set the first grace period to a period that is less than the current grace period to minimize uncompensated execution of software instances 22 (block 312).

In a fourth example, the activation service node $16_{ASN1}$ determines that a blockchain block propagation duration between times the first plurality of blockchain blocks were sent by a block-issuing node $16_{BIN}$ and times the first plurality of blockchain blocks were received by the activation service node $16_{ASN1}$ (block 314). For example, the blockchain blocks may contain timestamps that identify times at which the blockchain blocks were committed to the blockchain 18, and thus approximately the time that such blockchain blocks were broadcasted by the block-issuing node $16_{BIN}$. The activation service node $16_{ASN1}$ may compare the timestamp of each blockchain block to the current time that the activation service node $16_{ASN1}$ received the respective blockchain block. If the difference in times exceeds a predetermined threshold, this may be an indication of a network delay at some point or points between the activation service node $16_{ASN1}$ and the block-issuing node $16_{BIN}$ that is inhibiting timely receipt of blockchain blocks broadcasted by the block-issuing node $16_{BIN}$. In response, the activation service node $16_{ASN1}$ may set the first grace period to a period that is greater than the current grace period (block 316).

Figure 5:
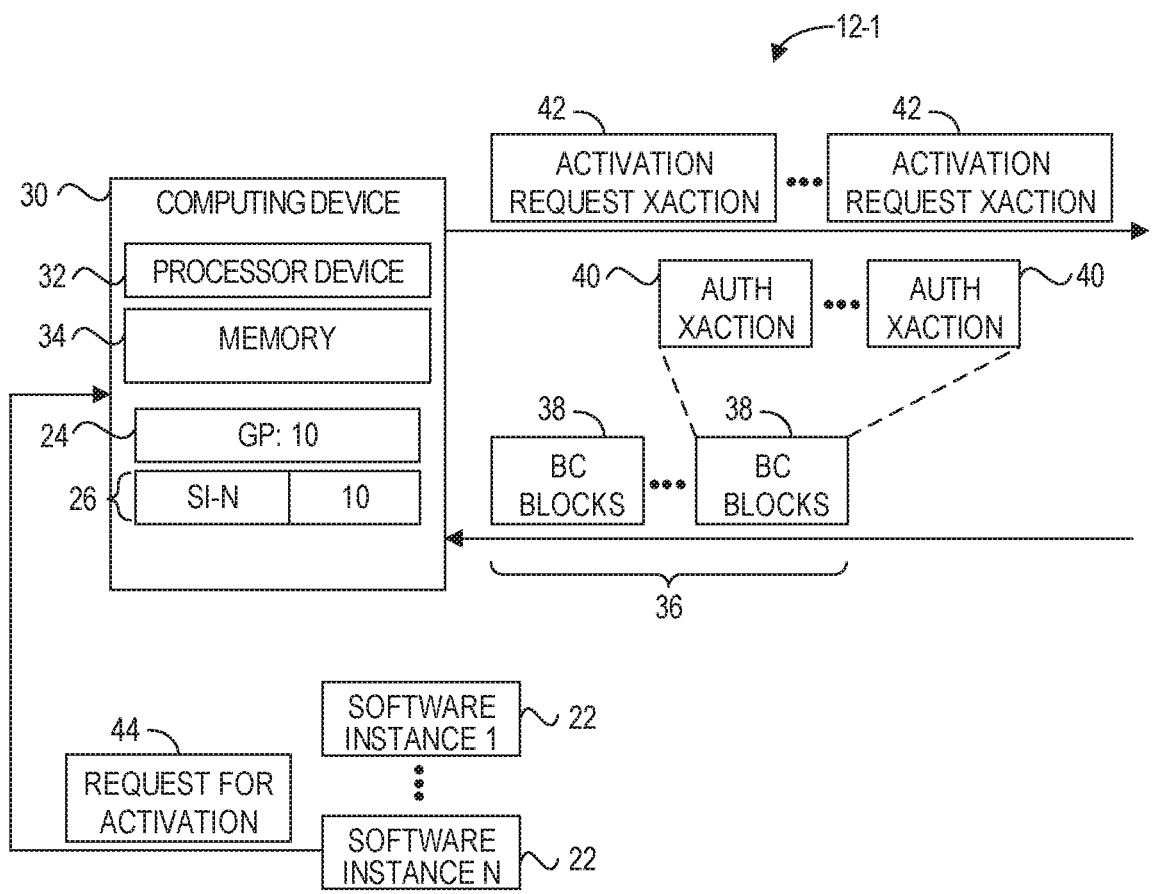
FIG. 5 is a block diagram of a compute instance illustrated in FIG. 1 according to one example.

FIG. 5 is a block diagram of the compute instance 12-1 according to one example. The compute instance 12-1 includes a computing device 30. The computing device 30 includes a processor device 32 and a memory 34. In this example, the activation service node $16_{ASN1}$ is a component of the computing device 30, and thus functionality implemented by the activation service node $16_{ASN1}$ may be attributed to the computing device 30 generally. Moreover, in examples where the activation service node $16_{ASN1}$ comprises software instructions that program the processor device 32 to carry out functionality discussed herein, functionality implemented by the activation service node $16_{ASN1}$ may be attributed herein to the processor device 32. The processor device 32 is coupled to the memory 34 and is programmed to receive a first plurality 36 of blockchain blocks 38 that contain authorized transactions 40 that authorize corresponding activation request transactions 42 associated with software instances 22 of a plurality of software instances 22. The processor device 32 determines a first grace period 24 that differs from a current grace period 24, based at least in part on at least one characteristic of the first plurality 36 of blockchain blocks 38. The processor device 32 receives a request for activation 44 associated with a first software instance 22. The processor device 32 sets the execution timer 26 for the first software instance 22 to the first grace period 24 to allow the first software instance 22 to execute for at least the first grace period 24.

Figure 6:
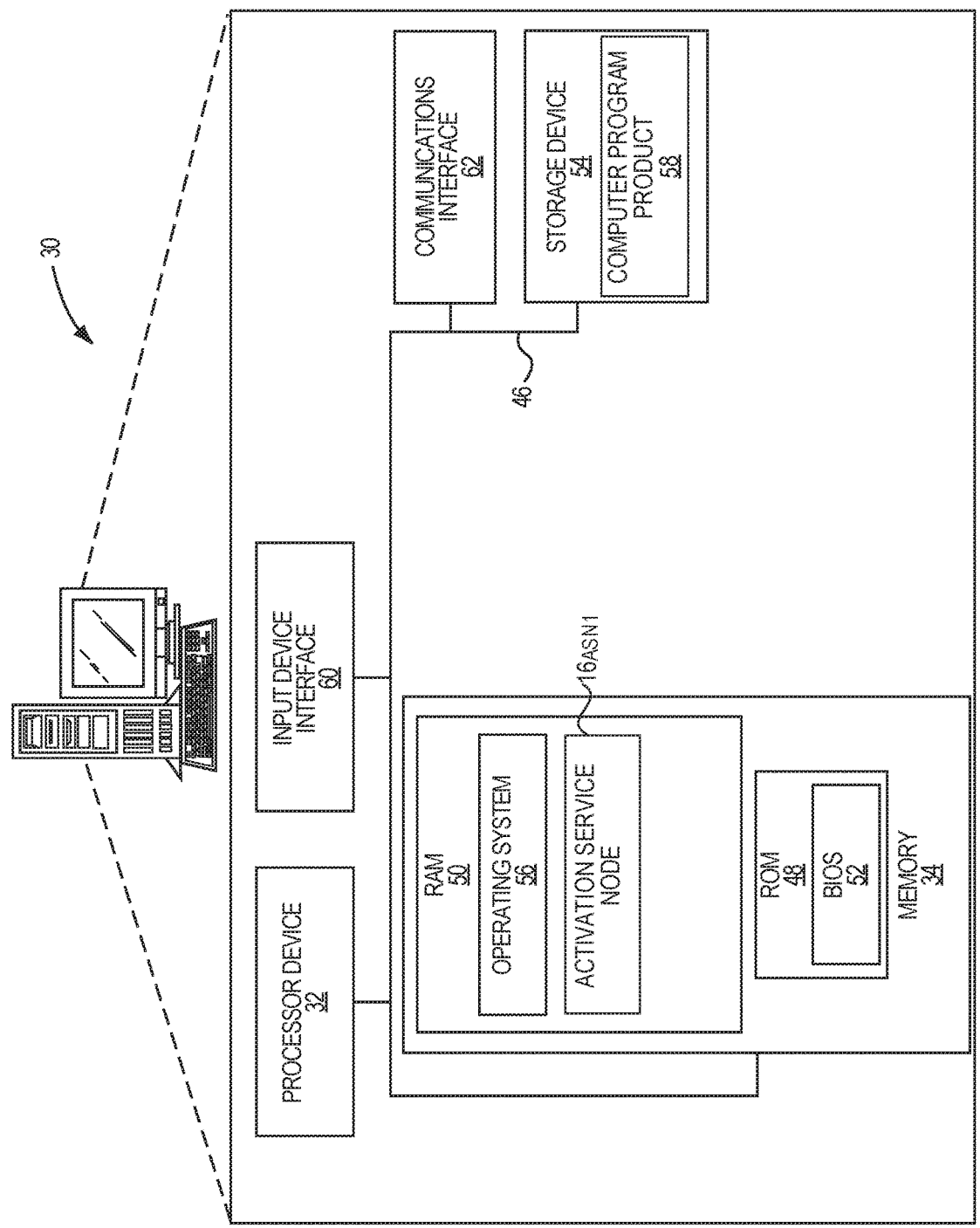
FIG. 6 is a block diagram of a computing device suitable for implementing examples according to one example.

FIG. 6 is a block diagram of the computing device 30 illustrated in FIG. 5 shown in greater detail according to one example. The computing device 30 may comprise any computing or electronic device capable of including firmware, hardware, and/or executing software instructions to implement the functionality described herein, such as a computer server, a desktop computing device, a laptop computing device, or the like. The computing device 30 includes the processor device 32, the system memory 34, and a system bus 46. The system bus 46 provides an interface for system components including, but not limited to, the system memory 34 and the processor device 32. The processor device 32 can be any commercially available or proprietary processor.

The system bus 46 may be any of several types of bus structures that may further interconnect to a memory bus (with or without a memory controller), a peripheral bus, and/or a local bus using any of a variety of commercially available bus architectures. The system memory 34 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing device 30. The volatile memory 50 may also include a high-speed RAM, such as static RAM, for caching data.

The computing device 30 may further include or be coupled to a non-transitory computer-readable storage medium such as a storage device 54, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 54 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 54 and in the volatile memory 50, including an operating system 56 and one or more program modules, such as the activation service node $16_{ASN1}$, which may implement the functionality described herein in whole or in part. It is to be appreciated that the examples can be implemented with various commercially available operating systems 56 or combinations of operating systems 56.

All or a portion of the examples may be implemented as a computer program product 58 stored on a transitory or non-transitory computer-usable or computer-readable storage medium, such as the storage device 54, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the activation service node $16_{ASN1}$ in the volatile memory 50, may serve as a controller, or control system, for the computing device 30 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 32 through an input device interface 60 that is coupled to the system bus 46 but can be connected by other interfaces such as a parallel port, an Institute of Electrical and Electronic Engineers (IEEE) 1394 serial port, a Universal Serial Bus (USB) port, an IR interface, and the like.

The computing device 30 may also include a communications interface 62 suitable for communicating with the network 14 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    receiving, by a computing device comprising a processor device, a first plurality of blockchain blocks that contain authorized transactions that authorize corresponding activation request transactions associated with software instances of a plurality of software instances;
    determining a first grace period that differs from a current grace period based at least in part on at least one characteristic of the first plurality of blockchain blocks;
    receiving a request for activation associated with a first software instance; and
    setting an execution timer for the first software instance to the first grace period to allow the first software instance to execute for at least the first grace period.

2. The method of claim 1 further comprising:
    receiving a second plurality of blockchain blocks after receiving the first plurality of blockchain blocks;
    determining a second grace period that differs from the first grace period based at least in part on at least one characteristic of the second plurality of blockchain blocks;
    receiving a request for activation associated with a second software instance; and
    setting an execution timer for the second software instance to the second grace period to allow the second software instance to execute for at least the second grace period.

3. The method of claim 1 further comprising:
    generating an activation request transaction based on the request for activation associated with the first software instance;
    broadcasting the activation request transaction to at least one node in a network of nodes that includes a block-issuing node;
    receiving, from the block-issuing node, a blockchain block that contains an authorized activation transaction that authorizes the activation request transaction; and
    in response to receiving the blockchain block, setting the execution timer for the first software instance to an execution period that is longer than the first grace period.

4. The method of claim 1 further comprising:
    determining that the first grace period has expired; and
    directing the first software instance to terminate.

5. The method of claim 1 wherein determining the first grace period that differs from the current grace period based at least in part on the at least one characteristic of the first plurality of blockchain blocks comprises:
    determining that the blockchain blocks in the first plurality of blockchain blocks contain a fewer number of authorized transactions than a previous plurality of blockchain blocks; and
    setting the first grace period to a period that is less than the current grace period.

6. The method of claim 1 wherein determining the first grace period that differs from the current grace period based at least in part on the at least one characteristic of the first plurality of blockchain blocks comprises:
    determining a first ratio of authorized transactions contained in a plurality of blockchain blocks received over a previous period of time to activation request transactions broadcasted over the previous period of time;
    determining a second ratio of authorized transactions contained in the first plurality of blockchain blocks received over a first period of time to activation request transactions broadcasted over the first period of time; and
    determining the first grace period based at least in part on a difference between the first ratio and the second ratio.

7. The method of claim 6 wherein determining the first grace period based at least in part on the difference between the first ratio and the second ratio comprises:

determining that the second ratio is greater than the first ratio; and
setting the first grace period to a period that is greater than the current grace period.

8. The method of claim 1 wherein determining the first grace period further comprises determining the first grace period based at least in part on the at least one characteristic of the first plurality of blockchain blocks and a software service type of the first software instance.

9. The method of claim 1 wherein determining the first grace period that differs from the current grace period based at least in part on the at least one characteristic of the first plurality of blockchain blocks comprises:
determining that the authorized transactions in the first plurality of blockchain blocks are received by the computing device within a predetermined proximity of an end of a respective grace period in effect at a time when the corresponding activation request transactions were broadcast by the computing device; and
setting the first grace period to a period that is less than the current grace period.

10. The method of claim 1 wherein determining the first grace period that differs from the current grace period based at least in part on the at least one characteristic of the first plurality of blockchain blocks comprises:
determining that a block propagation duration between times the first plurality of blockchain blocks were sent by a block-issuing node and times the first plurality of blockchain blocks were received by the computing device exceeds a predetermined threshold; and
setting the first grace period to a period that is greater than the current grace period.

11. The method of claim 1 further comprising:
receiving, from a first node, an activation request transaction associated with a software instance other than the first software instance; and
broadcasting the activation request transaction to at least one node in a network of nodes that includes a block-issuing node.

12. A computing device, comprising:
a memory; and
a processor device coupled to the memory to:
receive a first plurality of blockchain blocks that contain authorized transactions that authorize corresponding activation request transactions associated with software instances of a plurality of software instances;
determine a first grace period that differs from a current grace period based at least in part on at least one characteristic of the first plurality of blockchain blocks;
receive a request for activation associated with a first software instance; and
set an execution timer for the first software instance to the first grace period to allow the first software instance to execute for at least the first grace period.

13. The computing device of claim 12 wherein the processor device is further to:
receive a second plurality of blockchain blocks after receiving the first plurality of blockchain blocks;
determine a second grace period that differs from the first grace period based at least in part on at least one characteristic of the second plurality of blockchain blocks;
receive a request for activation associated with a second software instance; and
set an execution timer for the second software instance to the second grace period to allow the second software instance to execute for at least the second grace period.

14. The computing device of claim 12 wherein the processor device is further to:
generate an activation request transaction based on the request for activation associated with the first software instance;
broadcast the activation request transaction to at least one node in a network of nodes that includes a block-issuing node;
receive, from the block-issuing node, a blockchain block that contains an authorized activation transaction that authorizes the activation request transaction; and
in response to receiving the blockchain block, set the execution timer for the first software instance to an execution period that is longer than the first grace period.

15. The computing device of claim 12 wherein to determine the first grace period that differs from the current grace period based at least in part on the at least one characteristic of the first plurality of blockchain blocks, the processor device is further to:
determine a first ratio of authorized transactions contained in a plurality of blockchain blocks received over a previous period of time to activation request transactions broadcasted over the previous period of time;
determine a second ratio of authorized transactions contained in the first plurality of blockchain blocks received over a first period of time to activation request transactions broadcasted over the first period of time; and
determine the first grace period based at least in part on a difference between the first ratio and the second ratio.

16. The computing device of claim 12 wherein to determine the first grace period that differs from the current grace period based at least in part on the at least one characteristic of the first plurality of blockchain blocks, the processor device is further to:
determine that the blockchain blocks in the first plurality of blockchain blocks contain a fewer number of authorized transactions than a previous plurality of blockchain blocks; and
set the first grace period to a period that is less than the current grace period.

17. A computer program product stored on a non-transitory computer-readable storage medium and including instructions to cause a processor device to:
receive a first plurality of blockchain blocks that contain authorized transactions that authorize corresponding activation request transactions associated with software instances of a plurality of software instances;
determine a first grace period that differs from a current grace period based at least in part on at least one characteristic of the first plurality of blockchain blocks;
receive a request for activation associated with a first software instance; and
set an execution timer for the first software instance to the first grace period to allow the first software instance to execute for at least the first grace period.

18. The computer program product of claim 17 wherein the instructions are further to cause the processor device to:
receive a second plurality of blockchain blocks after receiving the first plurality of blockchain blocks;

determine a second grace period that differs from the first grace period based at least in part on at least one characteristic of the second plurality of blockchain blocks;

receive a request for activation associated with a second software instance; and set an execution timer for the second software instance to the second grace period to allow the second software instance to execute for at least the second grace period.

19. The computer program product of claim 17 wherein the instructions are further to cause the processor device to:

generate an activation request transaction based on the request for activation associated with the first software instance;

broadcast the activation request transaction to at least one node in a network of nodes that includes a block-issuing node;

receive, from the block-issuing node, a blockchain block that contains an authorized activation transaction that authorizes the activation request transaction; and in response to receiving the blockchain block, set the execution timer for the first software instance to an execution period that is longer than the first grace period.

20. The computer program product of claim 17 wherein to determine the first grace period that differs from the current grace period based at least in part on the at least one characteristic of the first plurality of blockchain blocks, the instructions are further to cause the processor device to:

determine a first ratio of authorized transactions contained in a plurality of blockchain blocks received over a previous period of time to activation request transactions broadcasted over the previous period of time;

determine a second ratio of authorized transactions contained in the first plurality of blockchain blocks received over a first period of time to activation request transactions broadcasted over the first period of time; and determine the first grace period based at least in part on a difference between the first ratio and the second ratio.

* * * * *